United States Patent [19]

Teraoka

[11] Patent Number: 4,585,944
[45] Date of Patent: Apr. 29, 1986

[54] RADIATION IMAGE STORAGE PANEL

[75] Inventor: Masanori Teraoka, Kanagawa, Japan

[73] Assignee: Fuji Photo Film Co., Ltd., Kanagawa, Japan

[21] Appl. No.: 455,610

[22] Filed: Jan. 4, 1983

[30] Foreign Application Priority Data

Jan. 14, 1982 [JP] Japan .................................. 57-4448

[51] Int. Cl.$^4$ .............................................. G03C 5/16
[52] U.S. Cl. ............................... 250/484.1; 250/486.1; 250/327.2
[58] Field of Search ................ 250/484.1, 327.2, 337, 250/486.1

[56] References Cited

U.S. PATENT DOCUMENTS 4,336,154 6/1982 Nishimura et al. .............. 250/327.2
4,368,390 1/1983 Takahashi et al. .............. 250/486.1
4,394,581 7/1983 Takahashi et al. .............. 250/486.1

Primary Examiner—Alfred E. Smith
Assistant Examiner—Jack I. Berman
Attorney, Agent, or Firm—Sughrue, Mion, Zinn, Macpeak and Seas

[57] ABSTRACT

A radiation image storage panel has at least one stimulable phosphor layer, and one or more layers provided on the stimulating rays incidence side of the stimulable phosphor layer. The latter layers respectively satisfy the condition of $d_{av} \times \mu < \lambda/2$ or $d_{av} \times \mu > \lambda$, wherein $d_{av}$ designates the average thickness of the layer, $\mu$ designates the refractive index of the layer, and $\lambda$ designates the wavelength of stimulating rays.

6 Claims, 3 Drawing Figures

FIG.1　　FIG.2　　FIG.3

RADIATION IMAGE STORAGE PANEL

BACKGROUND OF THE INVENTION

1. Field of the Invention

This invention relates to a radiation image storage panel for recording and reproducing a radiation image using a stimulable phosphor which stores radiation energy and emits light upon stimulation thereof, and more particularly to a radiation image storage panel which provides a radiation image of high quality.

2. Description of the Prior Art

A novel method for obtaining a radiation image is disclosed, for example, in U.S. Pat. Nos. 3,859,527, 4,236,078 and 4,258,264. In the method of the patents, there is used a radiation image storage panel comprising a stimulable phosphor which emits light when stimulated by an electromagnetic wave selected from among visible light and infrared rays after exposure to a radiation. (The term "radiation" as used herein means electromagnetic wave or corpuscular radiation such as X-rays, $\gamma$-rays, $\beta$-rays, $\gamma$-rays, high energy neutron rays, cathode rays, vacuum ultraviolet rays, ultraviolet rays, or the like.) The method comprises the steps of (i) causing the stimulable phosphor of the panel to absorb a radiation passing through an object, (ii) scanning the panel with an electromagnetic wave such as visible light or infrared rays (hereinafter referred to as "stimulating rays") to sequentially release the radiation energy stored in the panel as light emission, and (iii) detecting the emitted light and converting it into an image. The light emitted by the stimulable phosphor upon stimulation thereof is photoelectrically detected and converted to an electric signal by use of a photoelectric converter such as a photomultiplier. The electric signal can be processed in various ways as desired to reproduce a visible image of desired characteristics suitable for diagnostic purposes, which is a great advantage of this method using a radiation image storage panel.

The radiation image storage panel employed in the aforesaid method for recording and reproducing a radiation image has a phosphor layer comprising an appropriate binder and a stimulable phosphor dispersed therein. When the phosphor layer is self-supporting, the phosphor layer can by itself form the radiation image storage panel. In general, however, the phosphor layer is provided on an appropriate substrate to form the radiation image storage panel. Normally, a protective film for physically and chemically protecting the phosphor layer is provided on the phosphor layer on the side opposite to the substrate. In general, the protective film is constituted by a transparent thin film of polyethylene terephthalate, polyethylene, vinylidene chloride, nylon, or the like, and bonded to the surface of the phosphor layer by use of a transparent adhesive. Accordingly, an adhesive layer generally intervenes between the phosphor layer and the protective film. There are instances where a filter layer for absorbing the stimulating rays scattered in the protective film or the phosphor layer is formed between the adhesive layer and the protective film. Further, a prime-coating layer is sometimes formed between the phosphor layer and the substrate for the purpose of increasing adhesion therebetween.

When the radiation image storage panel is used in the aforesaid method for recording and reproducing a radiation image, it is first exposed to a radiation passing through an object to have a radiation image of the object stored therein, and is then scanned with stimulating rays which cause it to emit light in the pattern of the stored image. The emitted light is photoelectrically converted into an electric signal in time sequence. In general, the exposure of the radiation image storage panel to stimulating rays is conducted from the protective film side of the panel. However, when the substrate of the radiation image storage panel is permeable to stimulating rays, the exposure of the panel to stimulating rays may be conducted from the substrate side of the panel.

Stimulating rays are selected among visible light and infrared rays. In order to separate stimulating rays from the light emitted by the radiation image storage panel upon stimulation thereof which, in many cases, is light having a wavelength within a region of ultraviolet rays to blue light, and to prevent the panel from being heated, the stimulating rays should preferably have a wavelength within the range of 450 nm to 1,100 nm, more preferably 500 nm to 750 nm. In general, because of high stimulation energy, coherent light having a single wavelength, particularly a laser beam such as an Ar-laser beam (488 nm), a He-Ne laser beam (633 nm), a ruby laser beam (694 nm), a YAG-laser beam (1,640 nm), or the like is employed as the stimulating rays.

SUMMARY OF THE INVENTION

The primary object of the present invention is to provide a radiation image storage panel which provides a radiation image of high quality.

Another object of the present invention is to provide a radiation image storage panel exhibiting high durability.

Experiments conducted on factors adversely affecting the quality of the image reproduced from the radiation image storage panel revealed that, when coherent light having a single wavelength is used as the stimulating rays and the optical thickness of a layer provided on the stimulating ray incidence side of the phosphor layer in the radiation image storage panel is equal to the wavelength ($\lambda$) of the stimulating rays or a half thereof, interference of the stimulating rays occurring in the layer adversely affects the quality of the image obtained. The optical thickness (do) of the layer provided on the stimulating ray incidence side of the phosphor layer in the radiation image storage panel is expressed by $do = d \times \mu$ wherein "d" designates the actual thickness of the layer and "$\mu$" designates the refractive index of the layer. When $do = \lambda/2$ or $do = \lambda$, the intensity of the stimulating rays impinging upon the phosphor layer becomes uneven due to the interference of the stimulating rays occurring in the aforesaid layer (i.e. the interference between the light directly impinging upon the phosphor layer after passing through the aforesaid layer and the light impinging upon the phosphor layer after being reflected from the boundary between the aforesaid layer and the phosphor layer and then reflected from the opposite boundary of said layer). As a result, the density of the image obtained from the radiation image storage panel becomes uneven. It is assumed that the aforesaid interference of the stimulating rays occurs when $do = \lambda/2 \times n$, wherein "n" is an integer. However, it has been found that, in cases other than $do = \lambda/2$ and $do = \lambda$, the interference of the stimulating rays does not adversely affect the image quality.

The radiation image storage panel in accordance with the present invention comprises a phosphor layer containing a stimulable phosphor dispersed in a binder, and one or more layers provided on the stimulating rays incidence side of the phosphor layer, each of said one or more layers satisfying the condition of $$d_{av} \times \mu < \lambda/2, \text{ or}$$

$$d_{av} \times \mu > \lambda$$

wherein $d_{av}$ designates the average thickness of the layer, $\mu$ designates the refractive index of the layer, and $\lambda$ designates the wavelength of stimulating rays.

In the present invention, the average optical thickness (do.av) of each layer provided on the stimulating rays incidence side of the phosphor layer in the radiation image storage panel satisfies the condition of $$do.av < \lambda/2, \text{ or}$$

$$do.av > \lambda,$$

thereby preventing the interference of the stimulating rays, which causes the density of the image obtained to become uneven, from occurring in each layer. The average optical thickness (do.av) of each layer is the product of the actual average thickness (dav) of the layer and the refractive index ($\mu$) of the layer. Accordingly, the average optical thickness of each layer provided on the stimulating rays incidence side of the phosphor layer may be controlled by adjusting the average thickness (dav) of the layer or by controlling the refractive index ($\mu$) of the layer by appropriately selecting the material of the layer. Normally, however, the material of the layer is determined depending on the function which the layer should have, and the refractive index ($\mu$) does not greatly change according to the layer materials. In general, therefore, the average optical thickness (do.av) of the layer is controlled by adjusting the average thickness (dav) of the layer. In this case, because of difficulty of the formation of a very thin layer and from the viewpoint of the layer function, it is preferable to select the average thickness (dav) of the layer so that do.av satisfies the condition of do.av$>\lambda$. In the past, it sometimes happened that the protective film and the substrate unintentionally had an average optical thickness of do.av$>\lambda$. As for the adhesive layer and the prime-coating layer, however, it was considered that such layers should be as thin as possible to obtain better resolution and image sharpness insofar as the layers can achieve the desired function (i.e. the function of adhering or closely contacting the phosphor layer with the protective film or the substrate). Thus, in the past, the adhesive layer and the prime-coating layer had an average optical thickness within the range of $\lambda/2 \leq do.av \leq \lambda$. The inventors found that, even when the adhesive layer and the prime-coating layer also have an optical thickness of do.av$>\lambda$, the above-mentioned drawbacks are improved without adversely affecting the resolution and the image sharpness, and the adhesion between the phosphor layer and the protective film or the substrate is improved. Since the radiation image storage panel is carried by a transfer system at the time of image read-out, the improved adhesion results in an improvement in the durability of the panel. Each layer should more preferably have an average optical thickness within the range of do.av$\geq 1.05 \times \lambda$, particularly within the range of do.av$\geq 1.1 \times \lambda$.

BRIEF DESCRIPTION OF THE DRAWING

FIGS. 1, 2 and 3 are graphs showing the results of measurement of the density of radiation images obtained from the radiation image storage panels in accordance with the present invention (FIGS. 1 and 2) and from the conventional radiation image storage panel (FIG. 3).

DESCRIPTION OF THE PREFERRED EMBODIMENTS

The present invention will hereinbelow be described in further detail.

In the present invention, when the radiation image storage panel is used in such a way that the panel is exposed to stimulating rays from the protective film side of the panel, it is possible to form an adhesive layer for bonding the protective film to the phosphor layer, a filter layer for absorbing the scattered stimulating rays, and the like, in addition to the protective film, on the stimulating rays incidence side of the phosphor layer. When the substrate of the radiation image storage panel is permeable to stimulating rays and the panel is exposed to stimulating rays from the substrate side of the panel, it is possible to form a prime-coating layer for closely contacting the substrate with the phosphor layer, and the like, in addition to the substrate. Of course, any other layers may be provided on the stimulating rays incidence side of the phosphor layer insofar as the average optical thickness (do.av) of each layer satisfies the condition of do.av$<\lambda/2$ or do.av$>\lambda$.

Further, the present invention embraces the following aspects:

1. A radiation image storage panel as defined above wherein an adhesive layer and a protective film are provided, in this order starting from the phosphor layer side, on the stimulating rays incidence side of the phosphor layer.

2. A radiation image storage panel as defined above wherein an adhesive layer, a filter layer, and a protective film are provided, in this order starting from the phosphor layer side, on the stimulating rays incidence side of the phosphor layer.

3. A radiation image storage panel as defined above wherein a prime-coating layer and a substrate are provided, in this order starting from the phosphor layer side, on the stimulating ray incidence side of the phosphor layer.

4. A radiation image storage panel as defined in item 1 above wherein said adhesive layer and said protective film respectively satisfy the condition of $d_{av} \times \mu > \lambda$.

5. A radiation image storage panel as defined in item 2 above wherein said adhesive layer, said filter layer, and said protective film respectively satisfy the condition of $d_{av} \times \mu > \lambda$.

6. A radiation image storage panel as defined in item 3 above wherein said prime-coating layer and said substrate respectively satisfy the condition of $d_{av} \times \mu > \lambda$.

As the stimulable phosphor, it is possible to use, for example, a phosphor represented by the formula SrS:Ce,Sm; SrS:Eu,Sm; $La_2O_2S$:Eu,Sm; or (Zn,Cd)S:Mn,X wherein X is a halogen, as shown in U.S. Pat. No, 3,859,527. Further, as the stimulable phosphor, there can be used ZnS:Cu,Pb; $BaO \cdot xAl_2O_3$:Eu wherein $0.8 \leq x \leq 10$; $M^{II}O \cdot xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$; and LnOX:xA wherein Ln is at least one of La, Y, Gd and Lu, X is at least one of Cl and Br, A is at least one of Ce and Tb, x is a number satisfying $0<x<0.1$, as shown in U.S. Pat. No. 4,236,078. The stimulable phosphor may further be a phosphor represented by the formula $(Ba_{1-x},M_x^{II})FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$, as shown in U.S. Pat. No. 4,239,968. As the stimulable phosphor can also be used a phosphor represented by the formula $(Ba_{1-x-y},Mg_x,Ca_y)FX:aEu^{2+}$ wherein X is at least one of Cl, Br and I, x and y are numbers satisfying $0<x+y \leq 0.6$ and $xy \neq 0$, and a is a number satisfying $10^{-6} \leq a \leq 5 \times 10^{-2}$, as shown in Japanese Unexamined Patent Publication No. 55(1980)-12143. Another example of the stimulable phosphor is, as shown in U.S. Pat. No. 4,261,854, a phosphor represented by the formula $BaFX:xCe,yA$ wherein X is at least one of Cl, Br and I, A is at least one of In, Ta, Gd, Sm and Zr, x is a number satisfying $0<x \leq 2 \times 10^{-1}$, and y is a number satisfying $0<y \leq 5 \times 10^{-2}$. A further example of the stimulable phosphor is, as shown in Japanese Unexamined Patent Publication No. 56(1981)-2386, a phosphor represented by the formula $BaF_2.aBaX_2.bMe^IF.cMe^{II}F_2.dMe^{III}F_3.eLn$ wherein X is at least one of Cl, Br and I, $Me^I$ is at least one of Li and Na, $Me^{II}$ is at least one of Be, Ca and Sr, $Me^{III}$ is at least one of Al, Ga, Y and La, Ln is at least one of Eu, Ce and Tb, a is a number satisfying $0.90 \leq a \leq 1.05$, b is a number satisfying $0 \leq b \leq 0.9$, c is a number satisfying $0 \leq c \leq 1.2$, d is a number satisfying $0 \leq d \leq 0.03$, e is a number satisfying $10^{-6} \leq e \leq 0.03$, and b, c and d are not 0 at the same time. A still further example of the stimulable phosphor is, as shown in Japanese Unexamined Patent Publication No. 56(1981)-2385, a phosphor obtained by adding $MgF_2$ to a phosphor described in Japanese Unexamined Patent Publication No. 56(1981)-2386. Further, as the stimulable phosphor, there can be used $BaFX.aLiX'bBeX_2''.cM^{III}X_3''':dA$ wherein each of X, X', X'' and X''' is at least one of Cl, Br and I, $M^{III}$ is at least one of Al and Ga, A is at least one of Eu, Tb, Ge, Tm, Dy, Pr, Ho, Nd, Yb, Er, Gd, Lu, Sm and Y, a is a number satisfying $0 \leq a \leq 0.1$, b is a number satisfying $0 \leq b \leq 0.1$, c is a number satisfying $0 \leq c \leq 0.1$, d is a number satisfying $10^{-6} \leq d \leq 0.2$, and $0 \leq a+b+c \leq 0.1$, as shown in Japanese Unexamined Patent Publication No. 56(1981)-74175. However, in the radiation image storage panel in accordance with the present invention, any other phosphors may be used insofar as they can emit light when exposed to stimulating rays after exposed to a radiation. From the practical viewpoint, it is preferable that the stimulable phosphor emit light having a wavelength within the range of 300 nm to 600 nm when exposed to stimulating rays having a wavelength within the range of 450 nm to 1,100 nm, particularly within the range of 450 nm to 750 nm.

The present invention is further illustrated by the following nonlimitative example.

EXAMPLE

A coating composition having a viscosity of 50 centistokes was prepared by mixing eight parts by weight of $BaFBr:Eu^{2+}$ phosphor as the stimulable phosphor, one part by weight of nitrocellulose as the binder, and a solvent mixture of acetone, ethyl acetate and butyl acetate. The coating composition was uniformly applied onto a polyethylene terephthalate film placed horizontally as the substrate. The film was then left to stand for one day and naturally dried to form a phosphor layer having a thickness of about $300\mu$ thereon.

On the other hand, a polyethylene terephthalate film having an average thickness of $10\mu$ was prepared for use as a protective film. The refractive index of this polyethylene terephthalate film was 1.6 and, therefore, the average optical thickness (do.av) of this protective film was $10\mu \times 1.6 = 16\mu$. Onto one surface of this protective film, a 2 wt. % adhesive solution containing a polyester adhesive dissolved in methanol was uniformly applied by use of a doctor coater having a clearance of $7\mu$. The applied solution was then dried to form a $0.1\mu$ adhesive layer. The refractive index of the polyester adhesive was 1.5 and, therefore, the average optical thickness (do.av) of the formed adhesive layer was $0.1\mu \times 1.5 = 0.15\mu$.

Thereafter, the protective film provided with the adhesive layer on one surface thereof is placed on the phosphor layer previously formed on the substrate so that the adhesive layer contacts the phosphor layer. The protective film was then bonded to the phosphor layer under heat and pressure. At this time, the average thickness of the adhesive layer did not change significantly and therefore the average optical thickness thereof did not change significantly.

In this manner, a radiation image storage panel (panel A) comprising the substrate, phosphor layer, adhesive layer and protective film stacked in this order was obtained. As described above, the average optical thickness (do.av) of the adhesive layer and the protective film of the panel A were $0.15\mu$ and $16\mu$, respectively.

Another radiation image storage panel (panel B) was made in the same manner as described above, except that a 5 wt. % adhesive solution was used instead of the 2 wt. % adhesive solution and a doctor coater having a clearance of $30\mu$ was used instead of the doctor coater having a clearance of $7\mu$. The average optical thickness (do.av) of the adhesive layer of the panel B was $1.0\mu \times 1.5 = 1.5\mu$, and the average optical thickness (do.av) of the protective film was equal to that in the panel A, i.e. $16\mu$.

For comparison, an additional radiation image storage panel (panel C) was made in the same manner as described above, except that an adhesive layer having an average thickness of $0.21\mu$ was formed by using a 5 wt. % ahesive solution instead of the 2 wt. % adhesive solution. The average optical thickness (do.av) of the adhesive layer of panel C was $0.21\mu \times 1.5 = 0.32\mu$, and the average optical thickness (do.av) of the protective film was equal to that in the panel A, i.e. $16\mu$.

Figures 1, 2, 3:
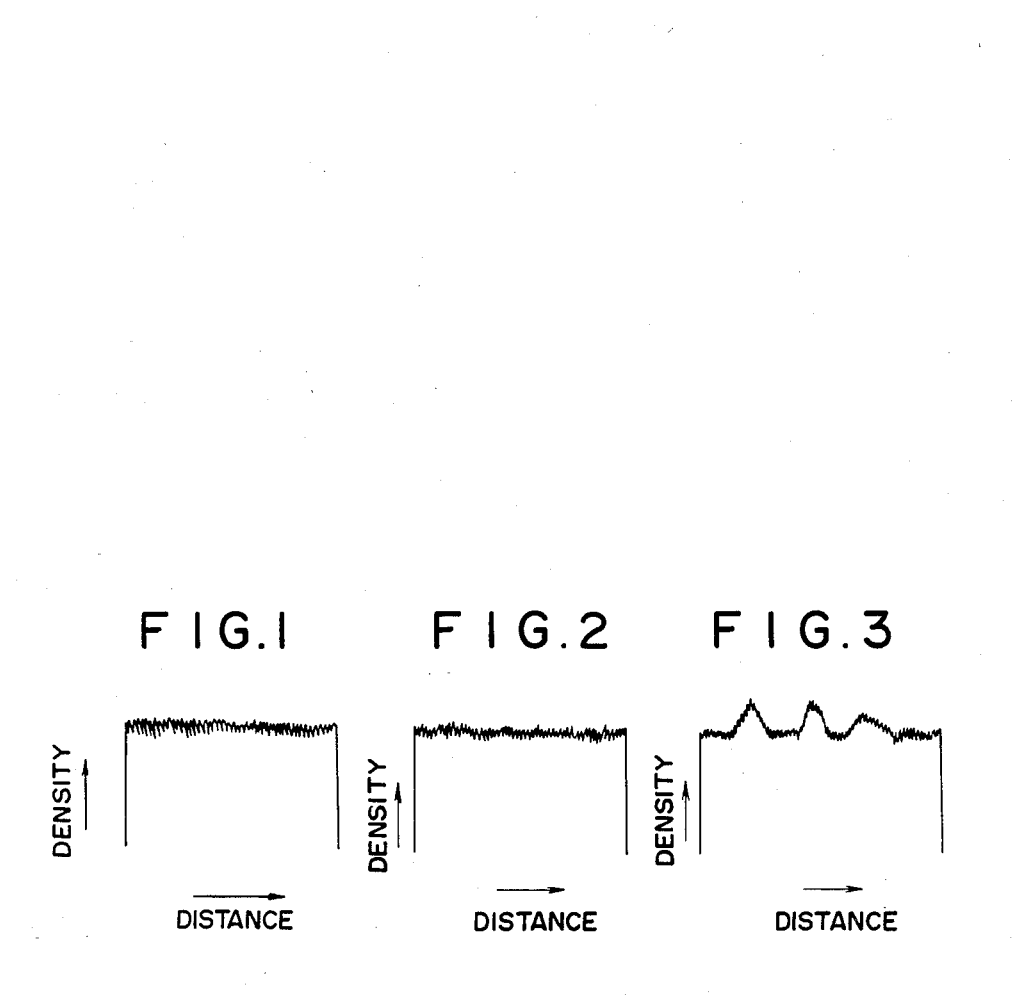

Thereafter, the panels A, B and C each were exposed to X-rays emitted from an X-ray source at a tube voltage of 80 kVp and a tube current of 250 mA, which was positioned at a distance of 180 cm from the panel. The protective film side of each panel was then scanned and stimulated with a He-Ne laser beam (633 nm). The light emitted from the phosphor layer upon stimulation thereof was received and converted into an electric signal by a light detector (a photomultiplier of spectral sensitivity S-5). The electric signal obtained was then reproduced to an image on an ordinary photographic film by use of an image reproducing apparatus. The density of each photograph obtained in this manner was measured by use of a microphotometer to obtain the results as shown in the figure. In the drawings, FIGS. 1, 2 and 3 show the density measurement results of the photographs reproduced from the panels A, B and C, respectively.

As shown in the drawings, in the photographs obtained from the panel A in accordance with the present invention, in which do.av of the adhesive layer was smaller than the half of the wavelength of the He-Ne laser beam, and from the panel B in accordance with the present invention, in which do.av of the adhesive layer was larger than the wavelength of the He-Ne laser beam, the image density was approximately and uniform. On the contrary, in the photograph obtained from the panel C, in which do.av of the adhesive layer was within the range between a half wavelength and one wavelength of the He-Ne laser beam and was near a half wavelength thereof, the image density increased at the portions where the optical thickness (do.) corresponded to a half wavelength of the He-Ne laser beam, and therefore, the image density of the photograph was uneven. Further, the radiation image obtained from the panels A and B exhibited approximately the same resolution and image sharpness. As for the separation of the protective film due to repeated use, the panel B exhibited higher resistance to such separation than the panel A.

I claim:

1. A radiation image storage panel comprising at least one stimulable phosphor layer, and one or more layers provided on the stimulating ray incidence side of said stimulable phosphor layer, each of said one or more layers satisfying the condition of $dav \times \mu \geqq 1.05 \times \lambda$ wherein dav designates the average thickness of the layer, $\mu$ designates the refractive index of the layer, and $\lambda$ designates the wavelength of stimulating rays; wherein an adhesive layer and a protective film are provided, in this order starting from said stimulable phosphor layer side, on said stimulating rays incidence side.

2. A radiation image storage panel as defined in claim 1 wherein said adhesive layer and said protective film respectively satisfy the condition of $dav \times \mu \geqq 1.1 \times \lambda$.

3. A radiation image storage panel comprising at least one stimulable phosphor layer, and one or more layers provided on the stimulating ray incidence side of said stimulable phosphor layer, each of said one or more layers satisfying the condition of $dav \times \mu \geqq 1.05 \times \lambda$ wherein dav designates the average thickness of the layer, $\mu$ designates the refractive index of the layer, and $\lambda$ designates the wavelength of stimulating rays; wherein an adhesive layer, a filter layer, and a protective film are provided, in this order starting from said stimulable phosphor layer side, on said stimulating rays incidence side.

4. A radiation image storage panel as defined in claim 3 wherein said adhesive layer, said filter layer, and said protective film respectively satisfy the condition of $dav \times \mu \geqq 1.1 \times \lambda$.

5. A radiation image storage panel comprising at least one stimulable phosphor layer, and one or more layers provided on the stimulating ray incidence side of said stimulable phosphor layer, each of said one or more layers satisfying the condition of $dav \times \mu \geqq 1.05 \times \lambda$ wherein dav designates the average thickness of the layer, $\mu$ designates the refractive index of the layer, and $\lambda$ designates the wavelength of stimulating rays; wherein a prime-coating layer and a substrate are provided, in this order starting from said stimulable phosphor layer side, on said stimulating rays incidence side.

6. A radiation image storage panel as defined in claim 5 wherein said prime-coating layer and said substrate respectively satisfy the condition of $dav \times \mu \geqq 1.1 \times \lambda$.

* * * * *